United States Patent
Pringle, IV et al.

(10) Patent No.: US 11,759,828 B2
(45) Date of Patent: Sep. 19, 2023

(54) METHODS FOR CLEANING SURFACES WITH BRUSHES

(71) Applicant: THE BOEING COMPANY, Chicago, IL (US)

(72) Inventors: John Walter Pringle, IV, Huntington Beach, CA (US); Nicholas Ryan Farrell, Long Beach, CA (US); Raul Tomuta, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 310 days.

(21) Appl. No.: 17/229,943

(22) Filed: Apr. 14, 2021

(65) Prior Publication Data

US 2021/0237125 A1 Aug. 5, 2021

Related U.S. Application Data

(62) Division of application No. 16/238,086, filed on Jan. 2, 2019, now Pat. No. 11,020,773.

(51) Int. Cl.
*B08B 1/00* (2006.01)
*B08B 1/04* (2006.01)
*B08B 5/04* (2006.01)
*B64F 5/30* (2017.01)
*A46B 11/06* (2006.01)
*A46B 13/00* (2006.01)
*B08B 3/04* (2006.01)

(52) U.S. Cl.
CPC ............ *B08B 1/002* (2013.01); *A46B 11/063* (2013.01); *A46B 13/005* (2013.01); *B08B 1/04* (2013.01); *B08B 3/04* (2013.01); *B08B 5/04* (2013.01); *B64F 5/30* (2017.01)

(58) Field of Classification Search
None
See application file for complete search history.

(56) References Cited

U.S. PATENT DOCUMENTS

| | | | | |
|---|---|---|---|---|
| 6,185,781 | B1 * | 2/2001 | Miller | A47L 9/0433 15/387 |
| 8,549,697 | B1 * | 10/2013 | Moyher, Jr. | A47L 11/4044 15/319 |
| 2017/0280961 | A1 * | 10/2017 | Pellegrino | A47L 13/16 |

* cited by examiner

*Primary Examiner* — Eric W Golightly
(74) *Attorney, Agent, or Firm* — The Small Patent Law Group LLC; Joseph M. Butscher

(57) ABSTRACT

A method of cleaning a surface includes steps of: urging brushes of a cleaning device against the surface; providing solvent to the surface via a solvent supply that passes through a housing of the cleaning device; rotating a drive gear about a drive-gear rotational axis to drive driven gears about corresponding driven-gear rotational axes inside the housing to rotate the brushes; and evacuating material from the surface via a vacuum tube, passing through the housing.

22 Claims, 12 Drawing Sheets

US 11,759,828 B2

METHODS FOR CLEANING SURFACES WITH BRUSHES

RELATED APPLICATIONS

This application is a division of U.S. patent application Ser. No. 16/238,086, filed Jan. 2, 2019, now U.S. Pat. No. 11,020,773, which is hereby incorporated by reference in its entirety.

TECHNICAL FIELD

The present disclosure relates to apparatuses and methods for cleaning a surface using brushes.

BACKGROUND

During assembly of a structure, such as an aircraft or a component thereof, oils or other contaminants or debris may accumulate on a surface. Solvent may be used to remove contaminants. However, simultaneously collecting contaminants, solvent, and solvent vapors has proven to be difficult.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to a cleaning device. The cleaning device comprises a housing. The cleaning device also comprises a drive gear that rotates about a drive-gear rotational axis. The cleaning device further comprises driven gears, driven by the drive gear and rotatable about corresponding driven-gear rotational axes inside the housing. The cleaning device further comprises brushes, located outside the housing and each rotatable together with a corresponding one of the driven gears. The cleaning device also comprises a vacuum tube, passing through the drive gear. The cleaning device additionally comprises a solvent supply, passing through the housing.

The cleaning device provides for the use of multiple brushes for pulling contaminant toward a central location for more efficient removal of contaminant and avoidance of dispersing contaminant laterally along surface being cleaned. Location of the vacuum tube passing through the drive gear allows the vacuum to be centrally located between the brushes while maintaining a compact design, for example providing a relative small diameter and/or width of the cleaning device for improved use in confined spaces and/or ease of handling by an operator.

Another example of the subject matter, disclosed herein, relates to a method of cleaning a surface. The method comprises urging brushes of a cleaning device against the surface. The method also comprises providing solvent to the surface via a solvent supply that passes through a housing of the cleaning device. The method further comprises rotating a drive gear about a drive-gear rotational axis to drive driven gears about corresponding driven-gear rotational axes inside the housing to rotate brushes. The method additionally comprises evacuating material from the surface via a vacuum tube, passing through the housing.

The method provides for the use of multiple brushes to pull contaminant toward a central location for more efficient removal of contaminant. The method also helps avoid or limit the dispersal of contaminant laterally along a surface being cleaned.

BRIEF DESCRIPTION OF THE DRAWINGS

Figure 1:
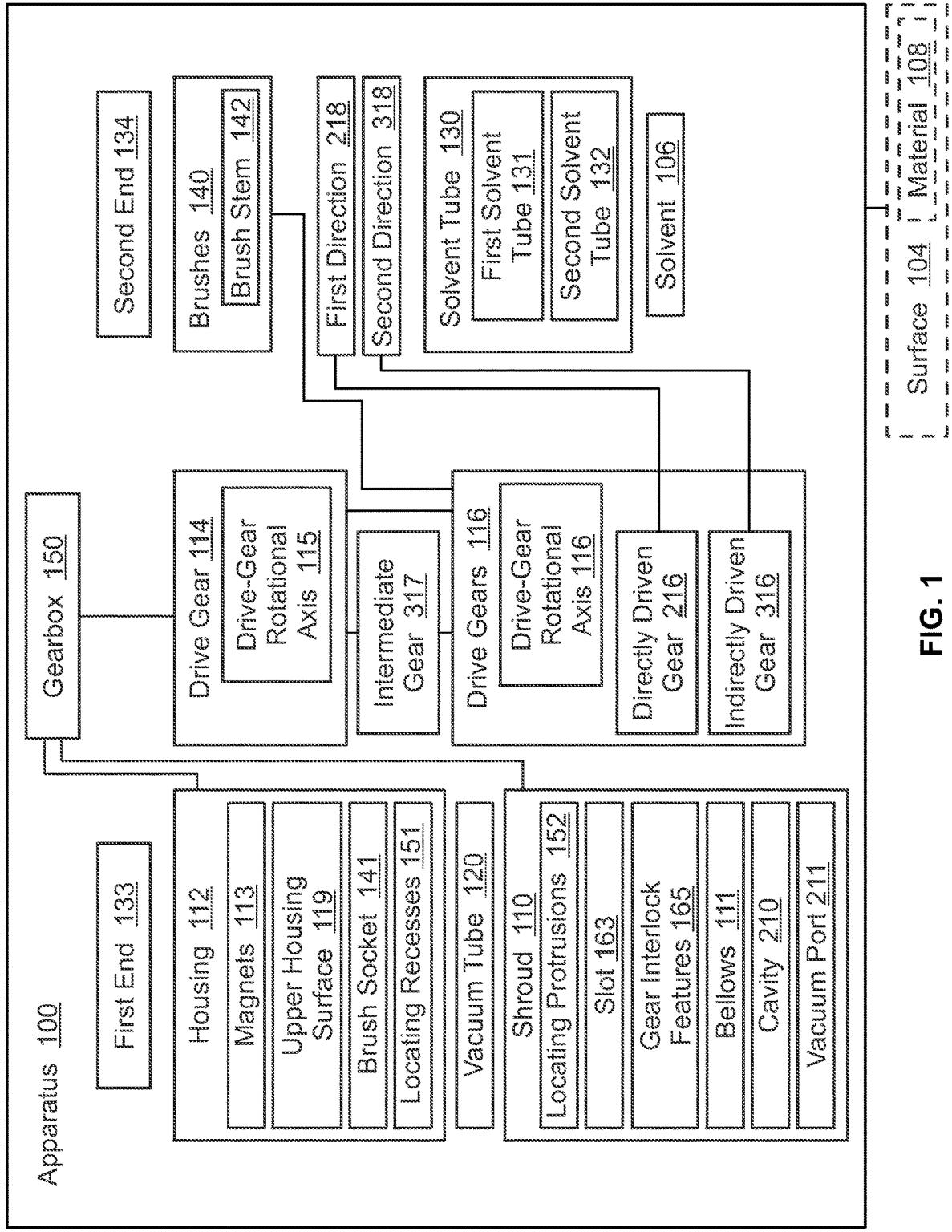
Figure 2:
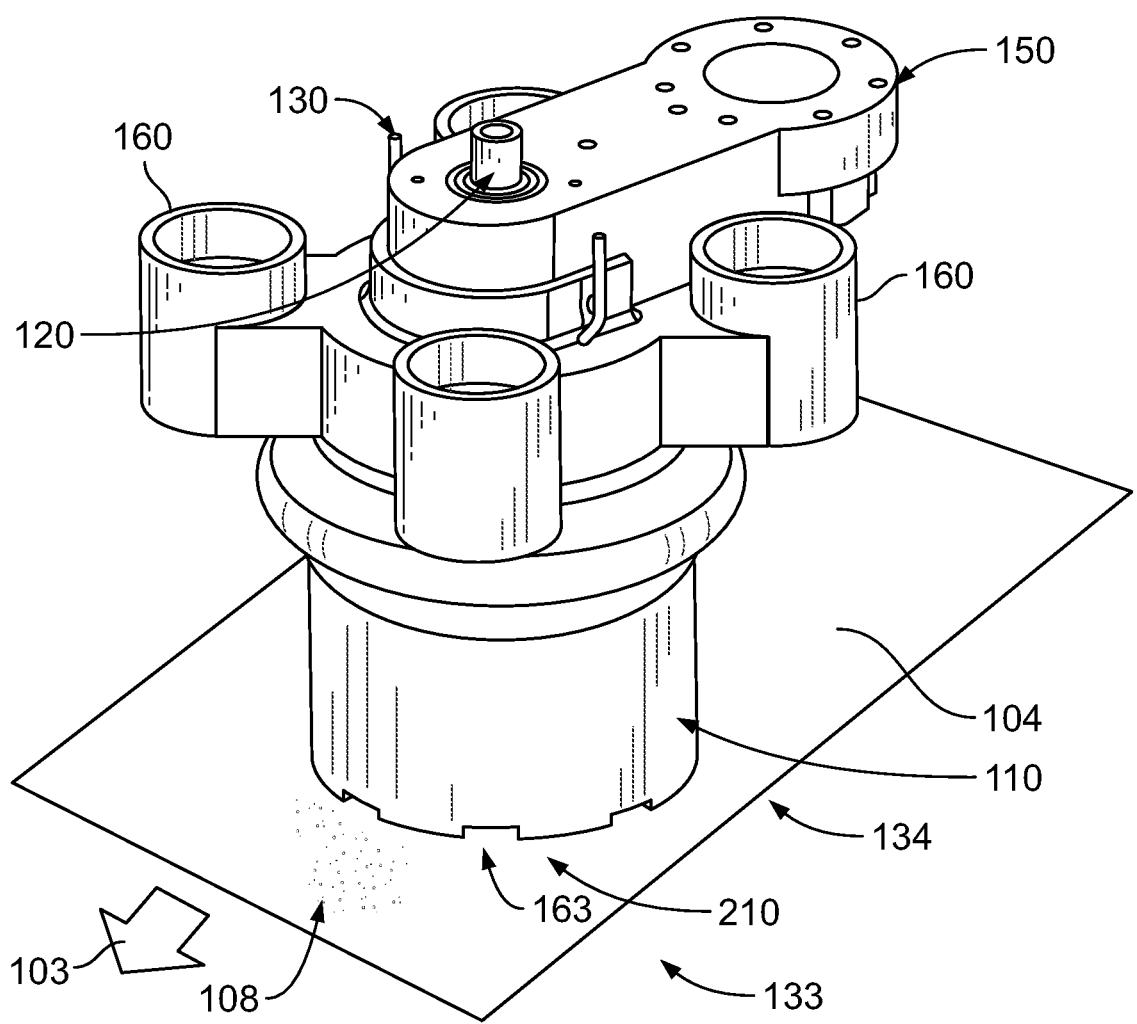
Figure 4:
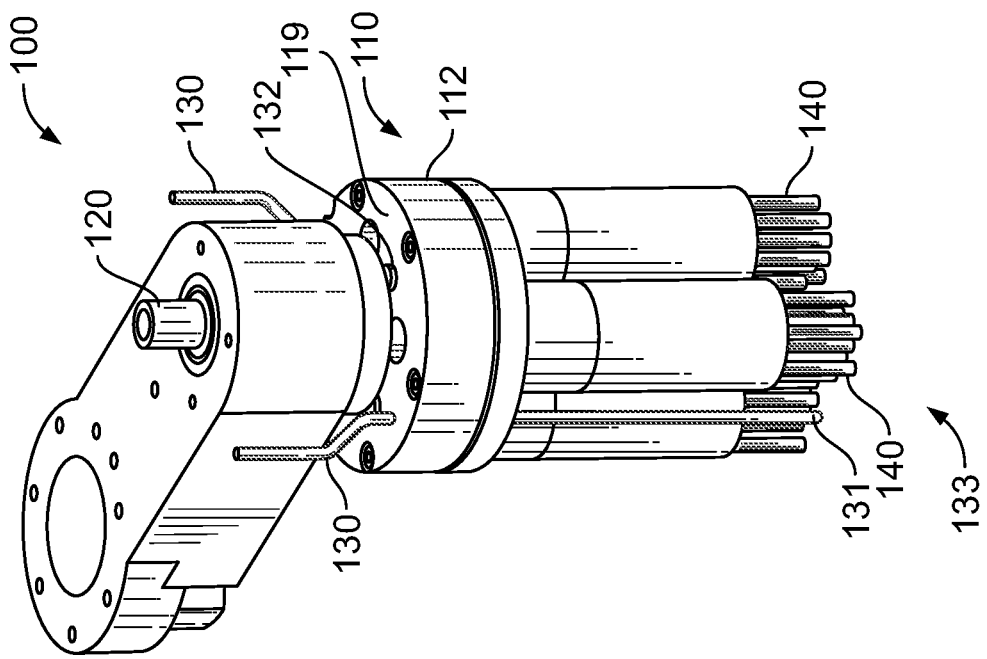
Figure 3:
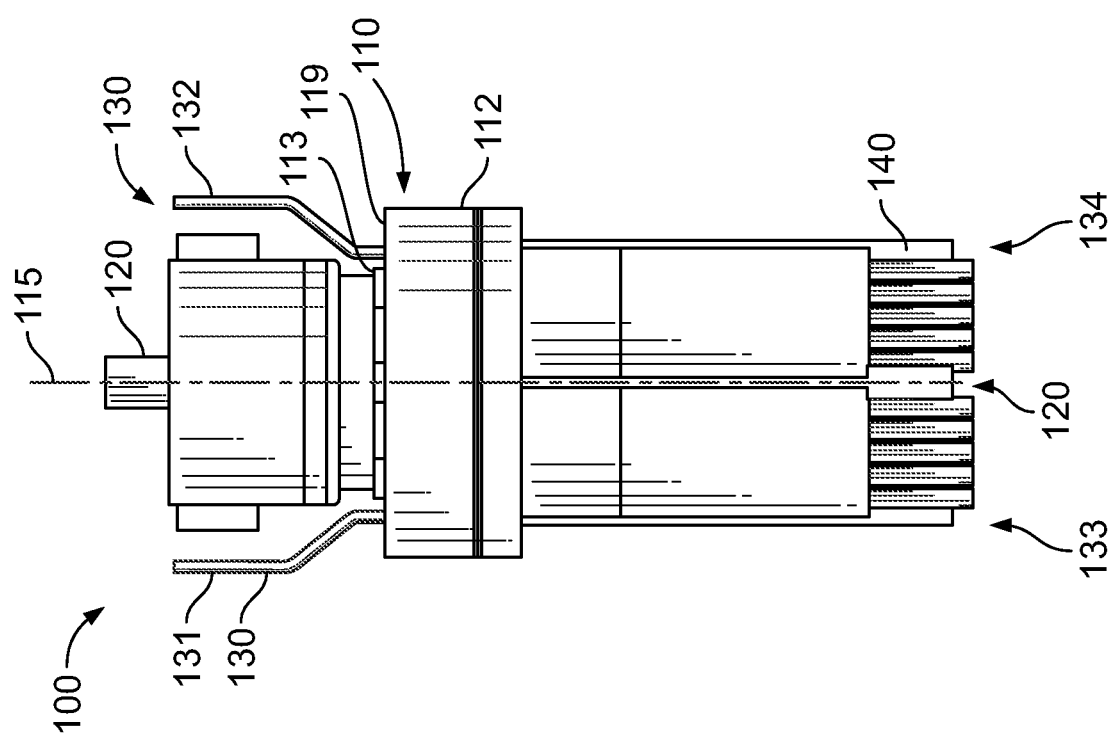
Figure 6:
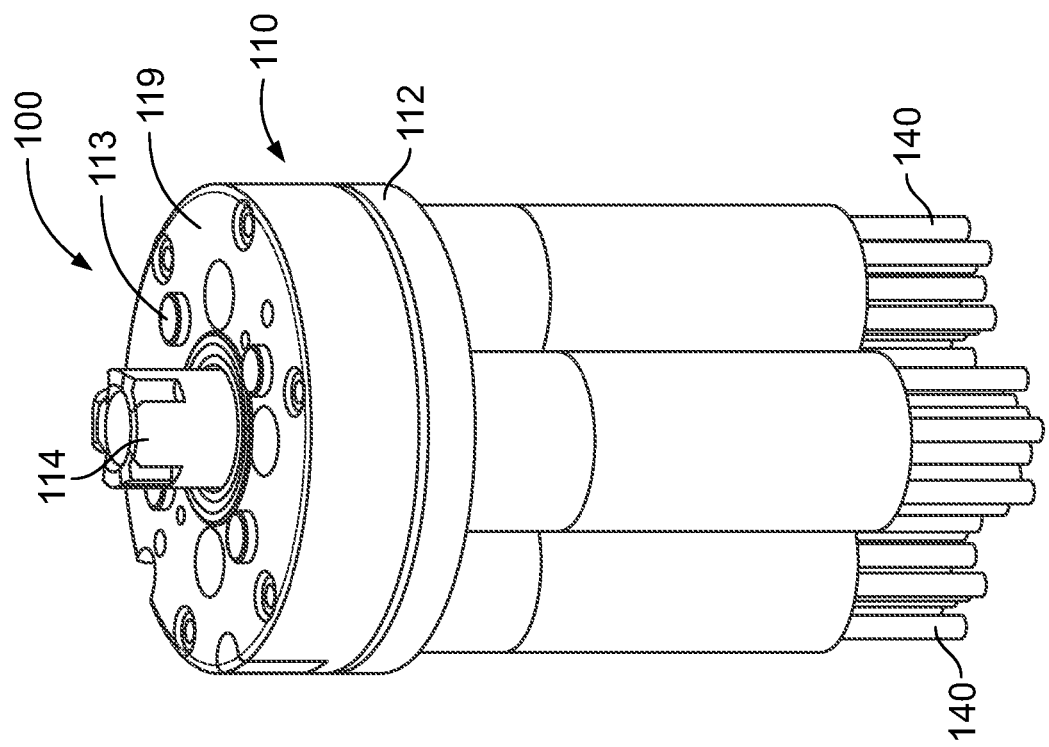
Figure 5:
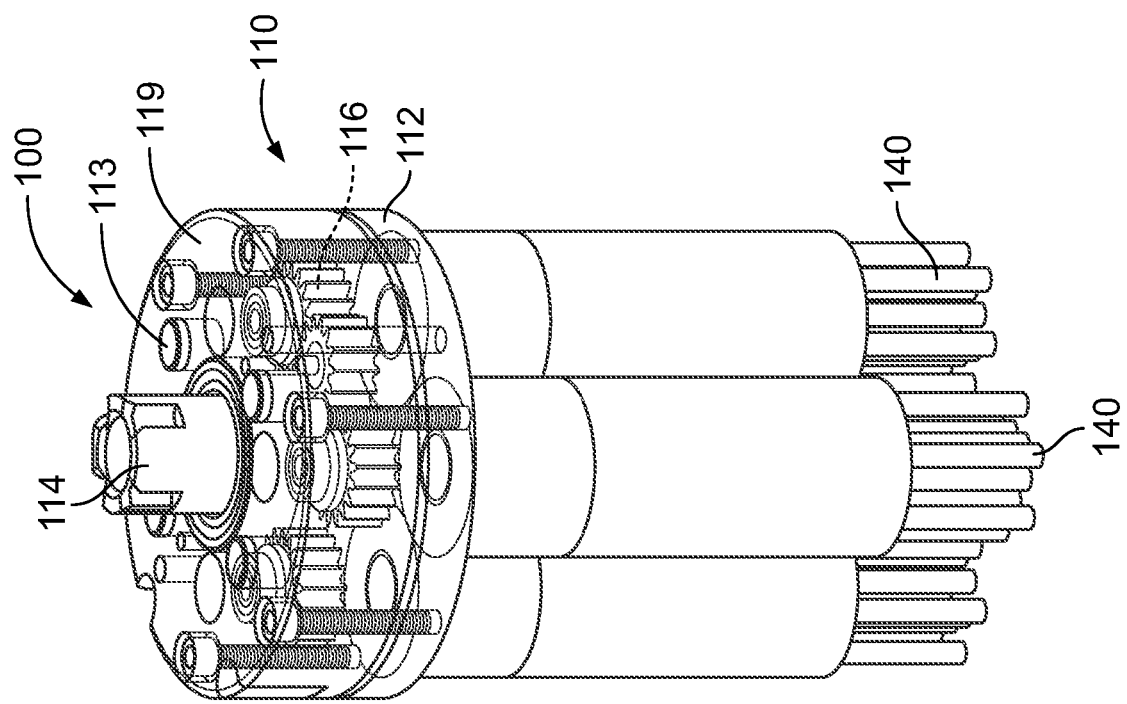
Figure 8:
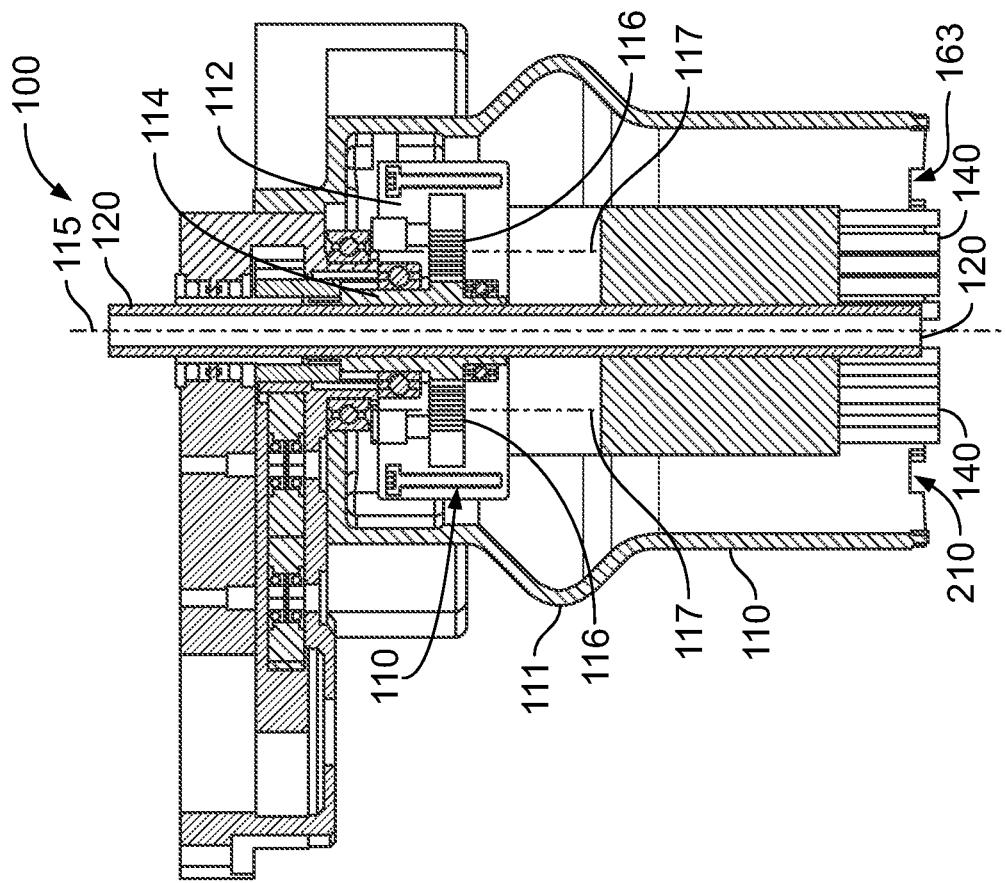
Figure 7:
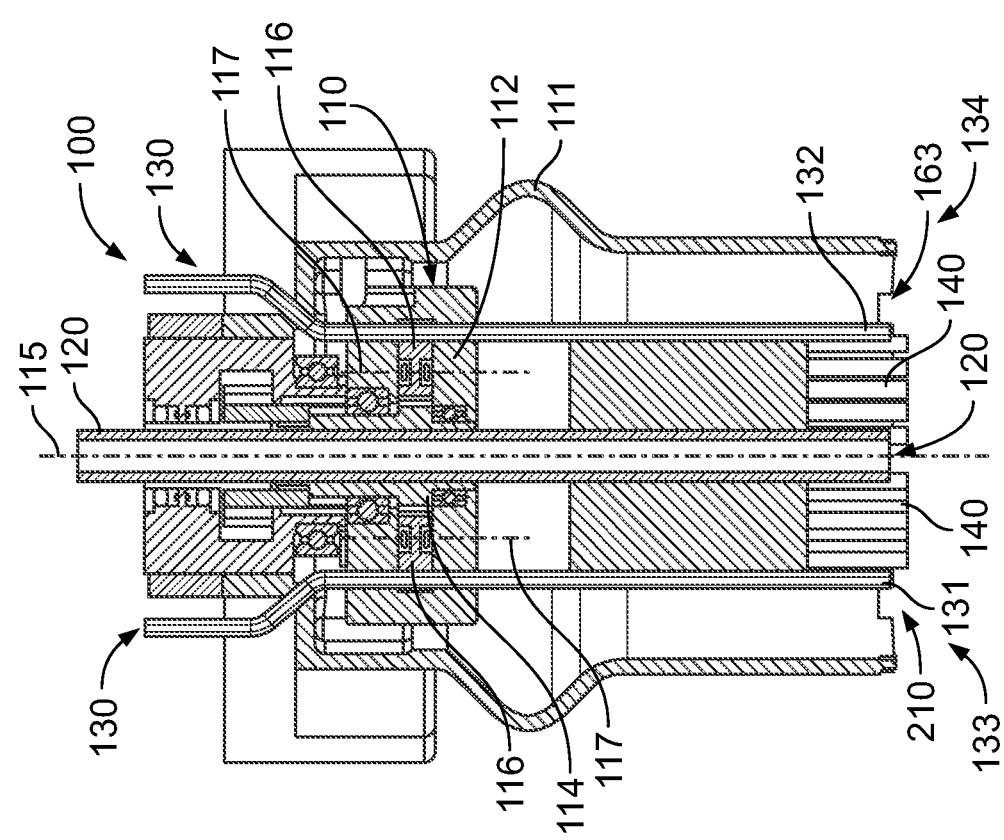
Figure 9:
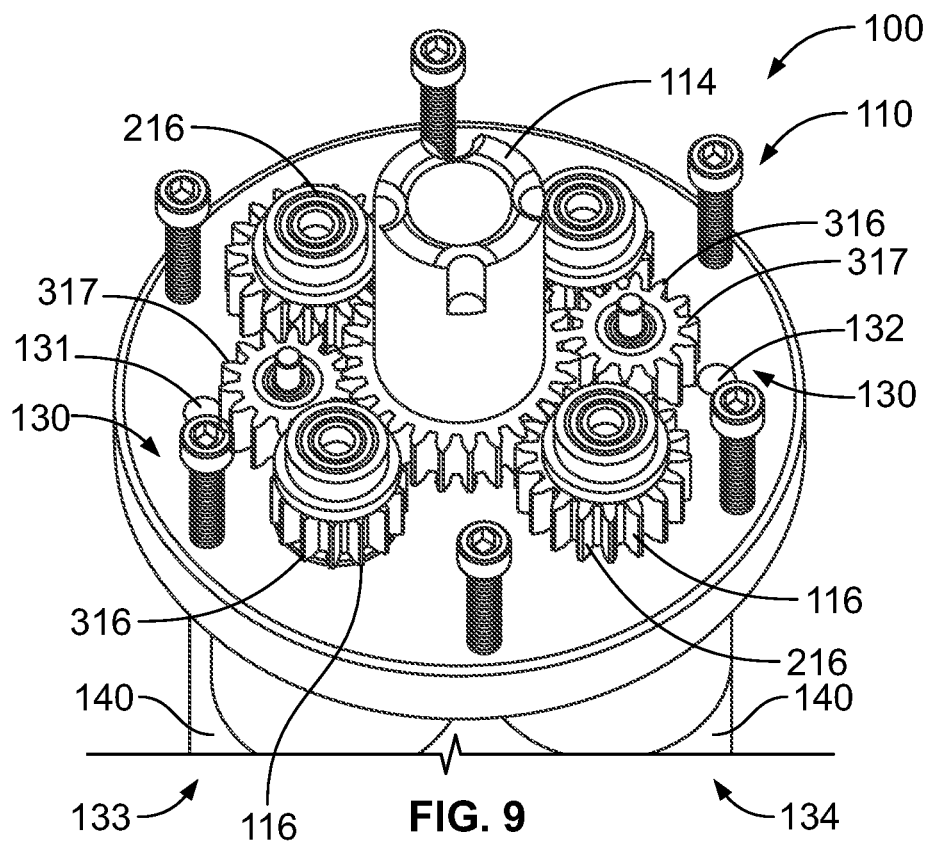
Figure 10:
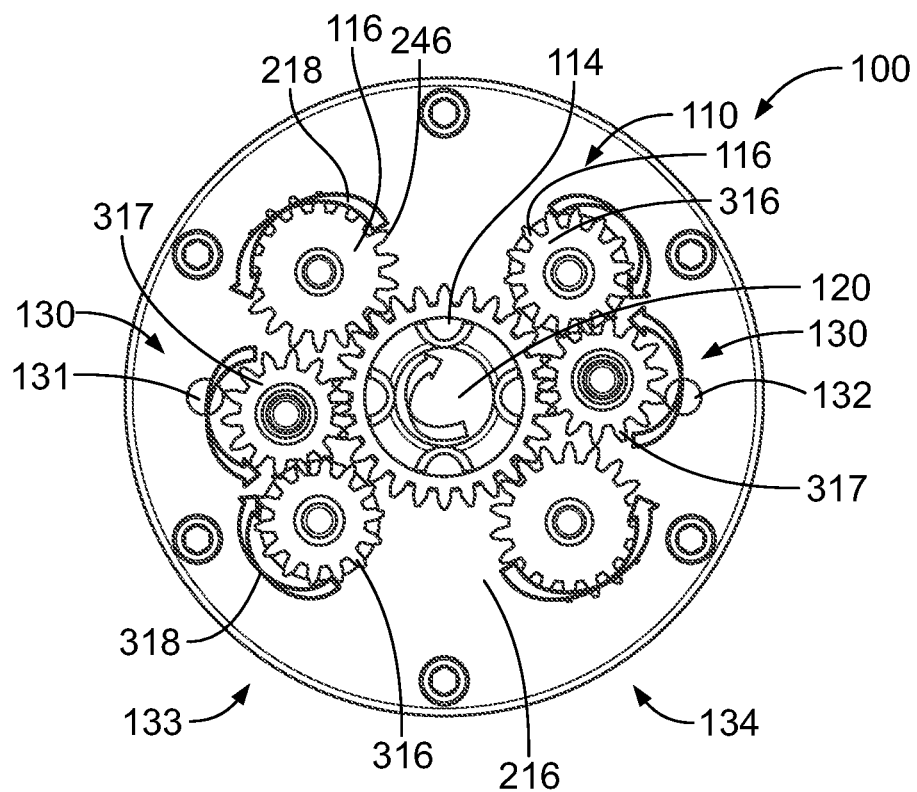
Figure 11:
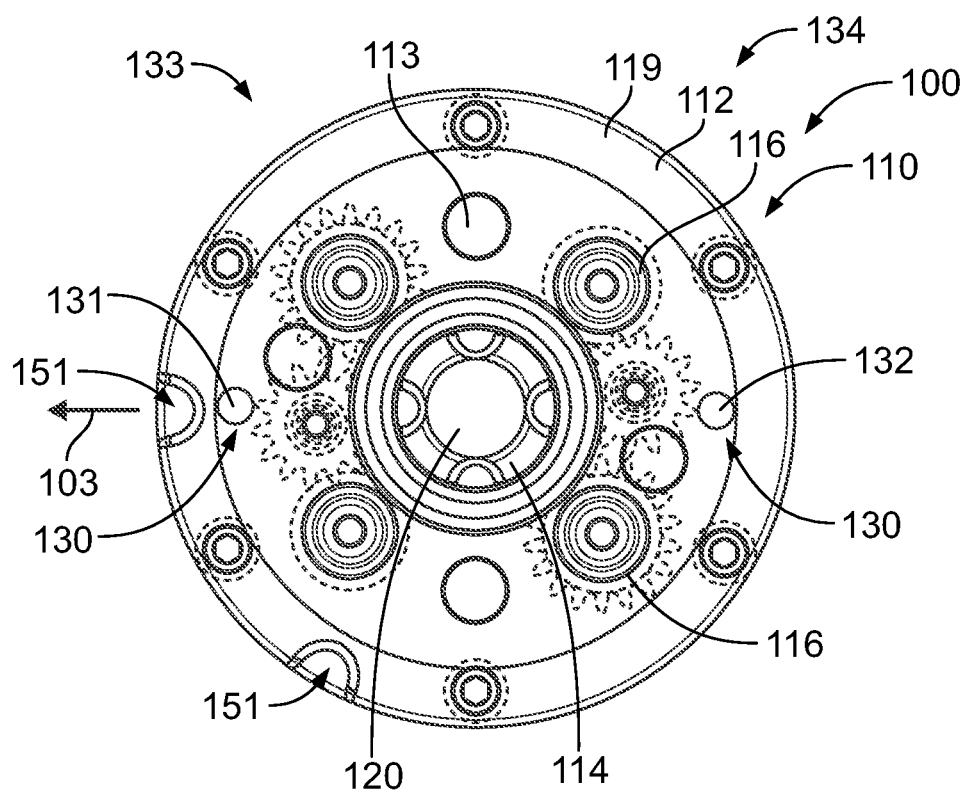
Figure 12:
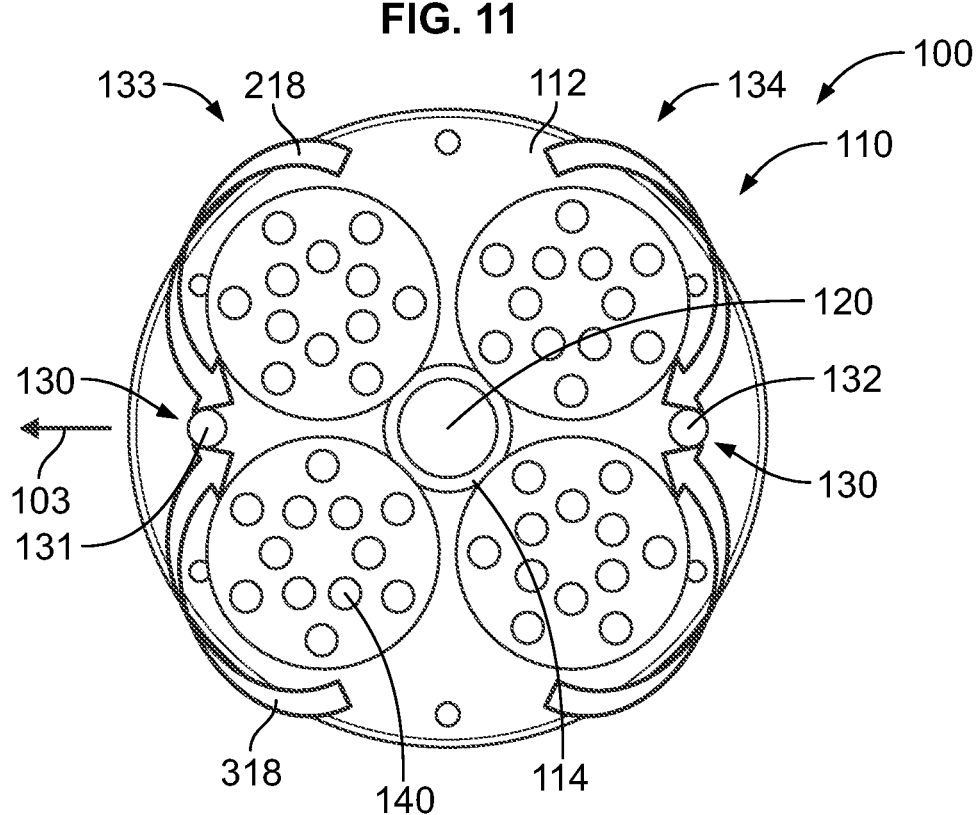
Figure 13A:
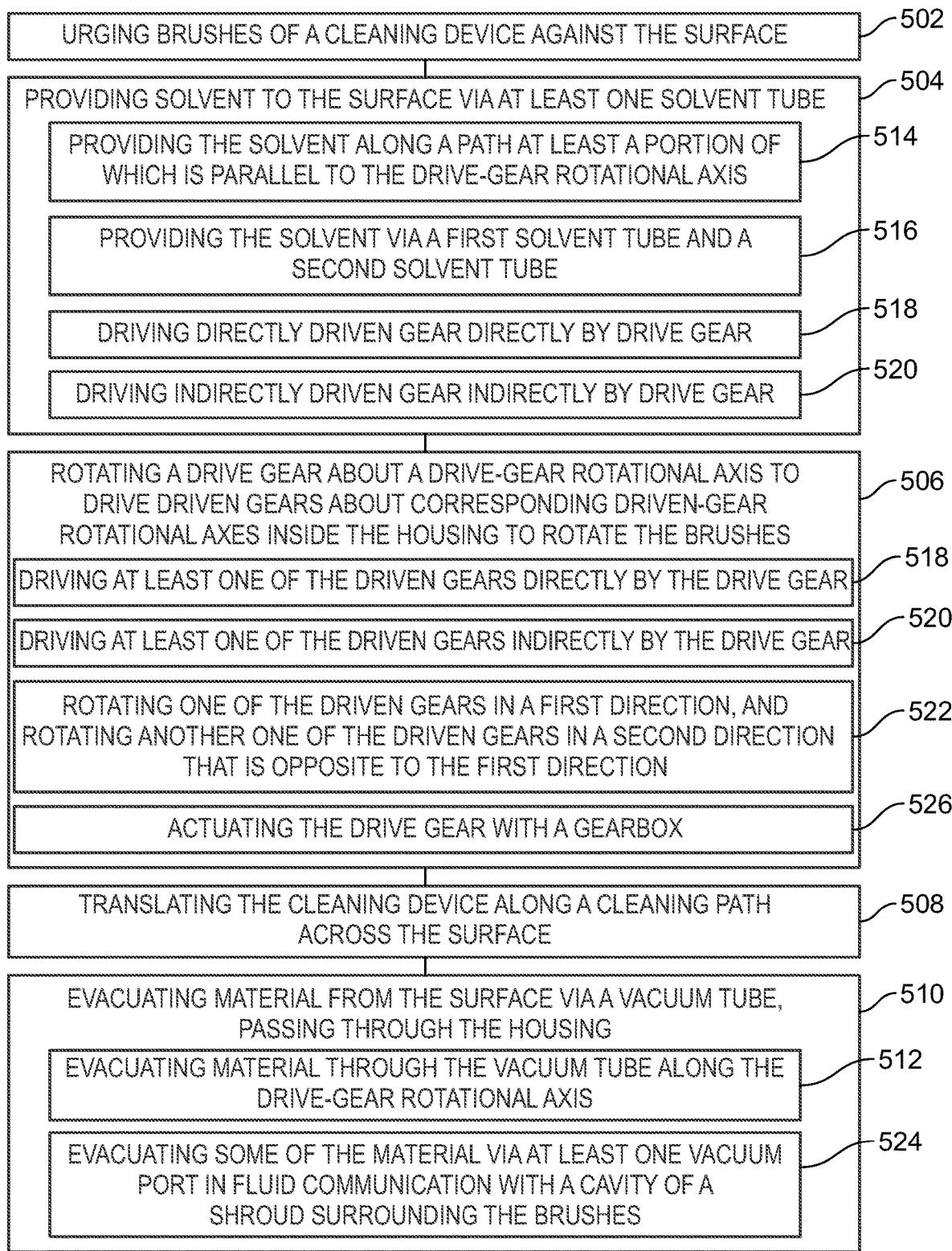
Figure 13B:
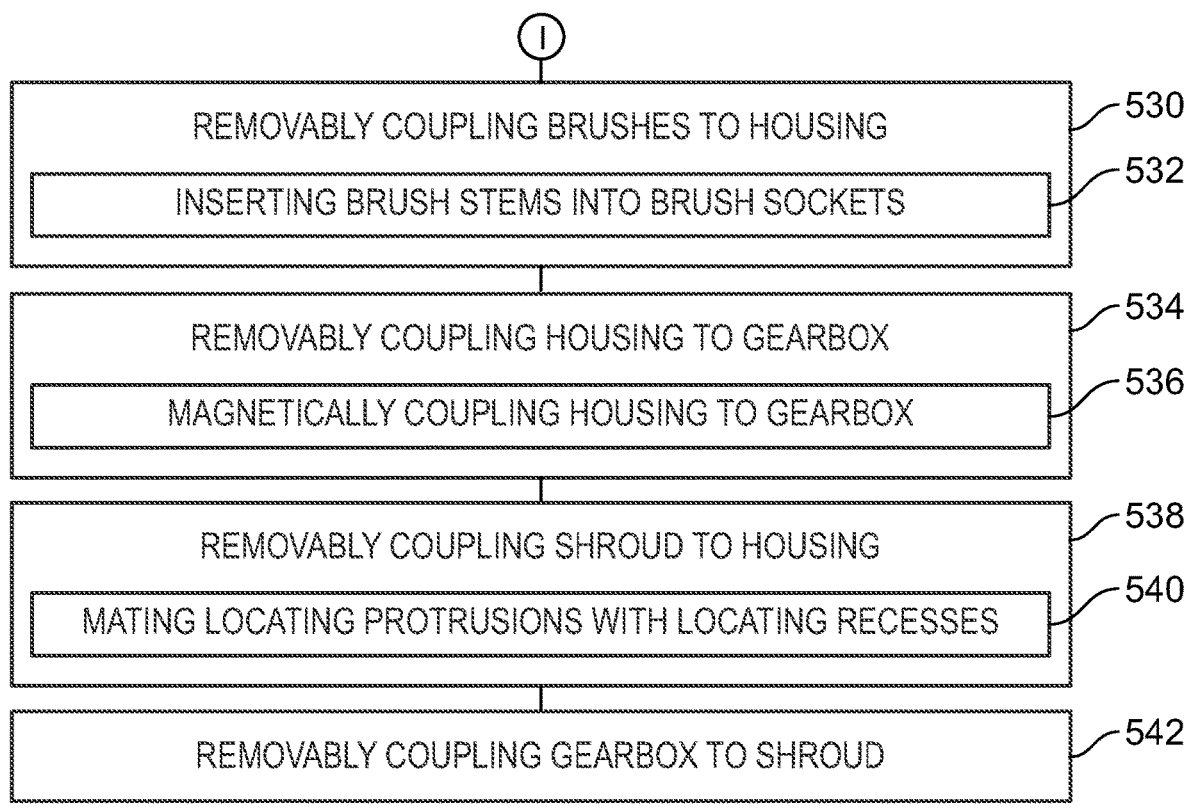
Figure 15:
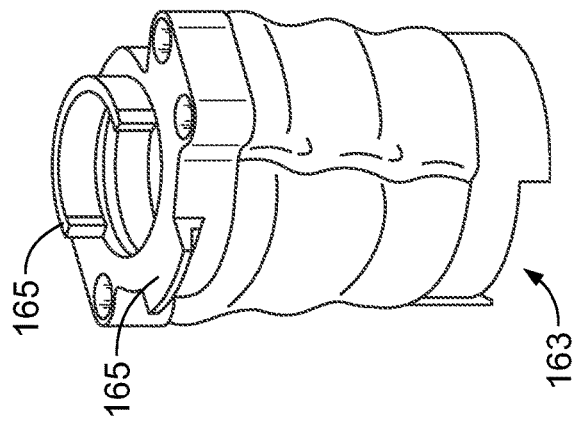
Figure 16:
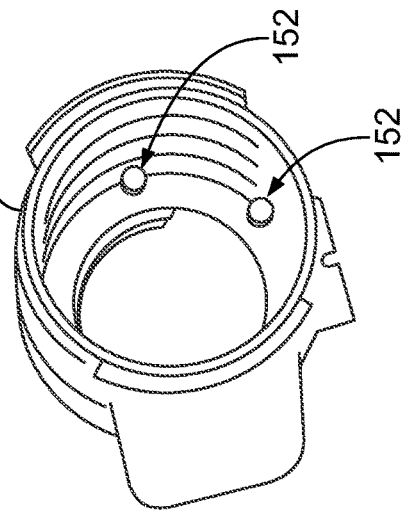
Figure 14:
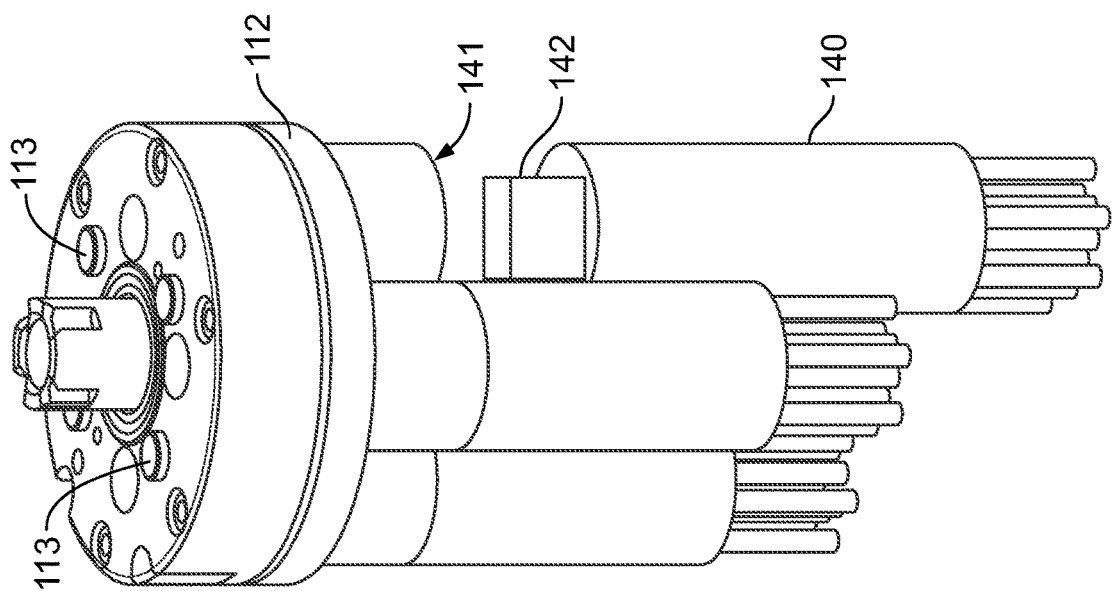
Figure 17:
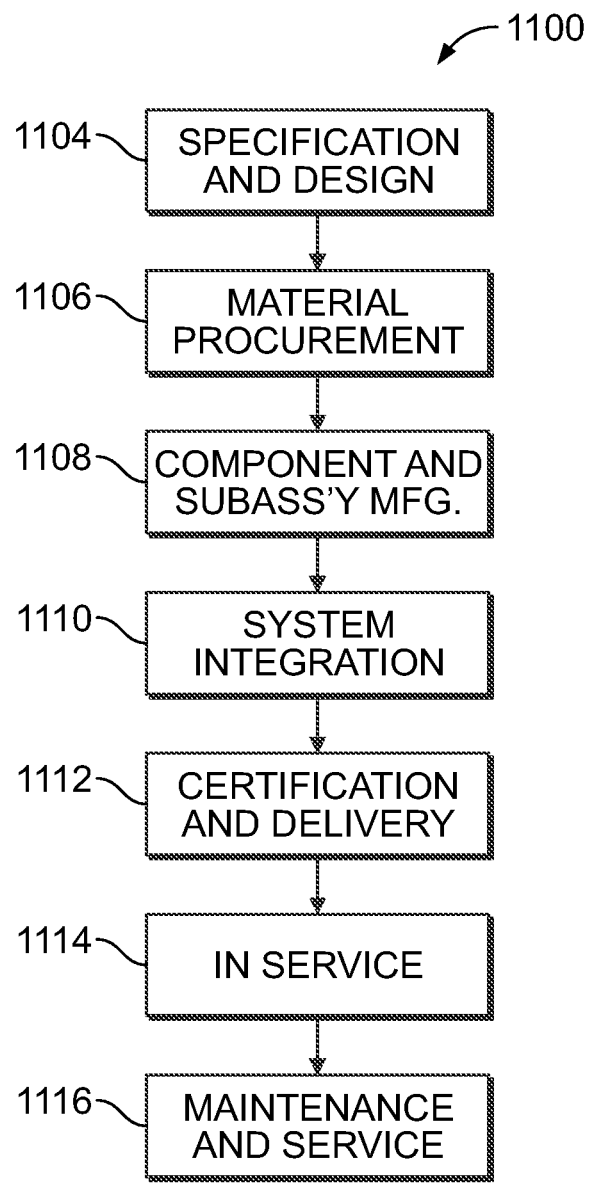

Having thus described one or more examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a cleaning device, according to one or more examples of the present disclosure;

FIG. 2 is a schematic, perspective view of the cleaning device of FIG. 1, located above a surface to be cleaned, according to one or more examples of the present disclosure;

FIG. 3 is a schematic, side sectional view of the cleaning device of FIG. 1, according to one or more examples of the present disclosure;

FIG. 4 is a schematic, perspective, partial cut-away view of the cleaning device of FIG. 1, according to one or more examples of the present disclosure;

FIG. 5 is a schematic, perspective, partial cut-away view of the cleaning device of FIG. 1, according to one or more examples of the present disclosure;

FIG. 6 is a schematic, perspective, partial cut-away view of the cleaning device of FIG. 1, according to one or more examples of the present disclosure;

FIG. 7 is a schematic, side sectional view of the cleaning device of FIG. 1, according to one or more examples of the present disclosure;

FIG. 8 is a schematic, side sectional view of the cleaning device of FIG. 1, according to one or more examples of the present disclosure;

FIG. 9 is a schematic, perspective, partial cut-away view of the cleaning device of FIG. 1, according to one or more examples of the present disclosure;

FIG. 10 is a schematic, plan, partial cut-away view of the cleaning device of FIG. 1, according to one or more examples of the present disclosure;

FIG. 11 is a schematic, plan, partial cut-away view of the cleaning device of FIG. 1, according to one or more examples of the present disclosure;

FIG. 12 is a schematic, bottom view of the cleaning device of FIG. 1, according to one or more examples of the present disclosure;

FIGS. 13A and 13B, collectively, are a block diagram of a method of cleaning a surface utilizing the cleaning device of FIG. 1, according to one or more examples of the present disclosure;

FIG. 14 is a schematic, perspective, partial cut-away view of brushes of the cleaning device of FIG. 1, according to one or more examples of the present disclosure;

FIG. 15 is a schematic, perspective, view of a shroud of the cleaning device of FIG. 1, according to one or more examples of the present disclosure;

FIG. 16 is a schematic, perspective view of the shroud of FIG. 15, according to one or more examples of the present disclosure;

FIG. 17 is a block diagram of aircraft production and service methodology; and

Figure 18:
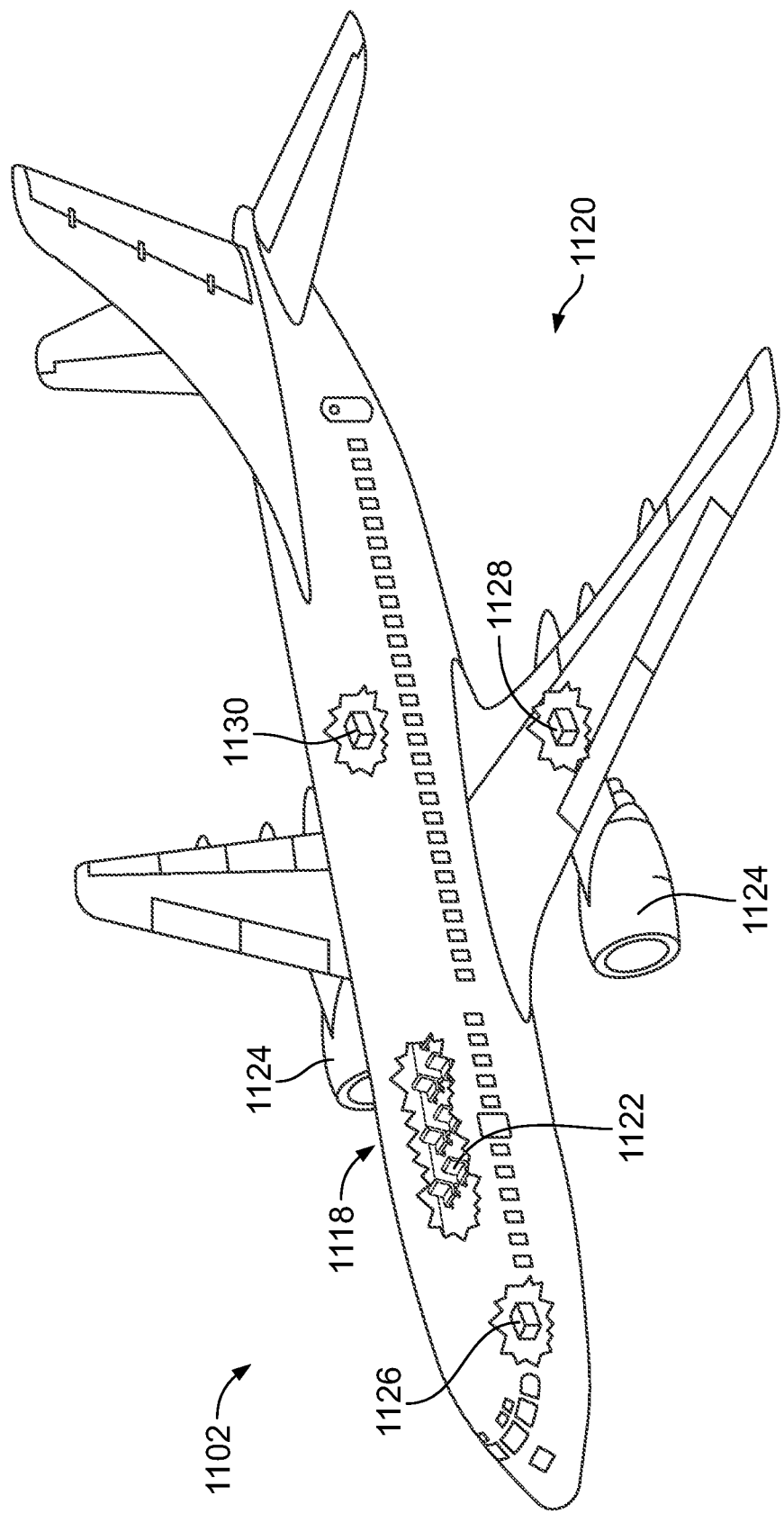

FIG. 18 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 13A, 13B, and 17, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13A, 13B, and 17 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-12, cleaning device 100 is disclosed. Cleaning device 100 comprises housing 112. Cleaning device 100 also comprises drive gear 114 that rotates about drive-gear rotational axis 115. Cleaning device 100 further comprises driven gears 116, driven by drive gear 114 and rotatable about corresponding driven-gear rotational axes 117 inside housing 112. Cleaning device 100 additionally comprises brushes 140, located outside housing 112 and each rotatable together with a corresponding one of driven gears 116. Cleaning device 100 also comprises vacuum tube 120, passing through drive gear 114, and solvent supply 130, passing through housing 112. The preceding subject matter of this paragraph characterizes example 1 of the present disclosure.

Cleaning device 100 provides multiple brushes 140 for pulling contaminant toward a central location (e.g., between the brushes) for more efficient removal of contaminant, and helps avoid dispersing contaminant laterally along surface 104 being cleaned. Cleaning device 100 also allows vacuum tube 120 to be centrally located between brushes 140 while maintaining a compact design, thereby improving ease of handling as well as use in confined spaces.

Generally, cleaning device 100 is used to apply solvent 106 to surface 104. Surface 104, in one or more examples, is a surface of a workpiece that has contaminant or undesirable material disposed thereon following and/or proceeding a process to be performed on the workpiece. Solvent supply 130 in various embodiments includes one or more tubes or hoses in fluidic communication with a solvent reservoir or source of solvent. Solvent supply 130 directs solvent toward surface 104, and brushes 140 apply solvent 106 to contaminant on surface 104 and distribute solvent 106 along surface 104, and also help direct material 108 to vacuum tube 120 to remove material 108 from surface 104. Material removed from surface 104, as used herein, includes one or more of contaminants (e.g., oils), solvent, solvent vapors, or debris.

It may be noted that, as discussed herein, in one or more examples, various aspects or components of cleaning device 100 are removably coupled together for convenient assembly and/or disassembly (e.g., for maintenance, repair, and/or replacement of particular components). As used herein, removably coupling two components together may be understood as coupling the two components such that they may be de-coupled without destruction or damaging either component under normal use.

In one or more examples, drive gear 114 is driven by a motor or other actuator that is mounted on or off cleaning device 100 in various embodiments. Additionally, in one or more examples, power to drive gear 114 is located on cleaning device 100 (e.g., a battery) or is provided from an external source (e.g., via a power cable). Similarly, in one or more examples, solvent 106 to be provided via solvent supply 130 is provided from cleaning device 100 (e.g., an on-board reservoir or reservoir removably coupled to cleaning device 100) or is provided externally (e.g., from a remote supply via a supply tube). Similarly, in one or more examples, vacuum tube 120 is coupled to an on-board supply of vacuum and collection reservoir for material 108, or is coupled to an external vacuum supply for removal and collection of material 108. It may further be noted that surface 104 may include irregularities or protrusions, including fasteners and/or joints or other locations where two different structures or components are joined.

Referring generally to FIG. 1 and particularly to, e.g., FIGS. 2-4, 7, and 8, vacuum tube 120 is co-axial with drive-gear rotational axis 115. The preceding subject matter of this paragraph characterizes example 2 of the present disclosure, wherein example 2 also includes the subject matter according to example 1, above.

Co-axial location of vacuum tube 120 along drive-gear rotational axis 115 provides for a convenient, compact design with vacuum tube 120 centrally located between brushes 140, and provides an efficient, central location for removal of contaminant driven by brushes toward a central location.

As used herein, a component that is co-axial with a second component may be understood as extending at least partially along an axis defined by the second component. It may be noted that co-axial components need not have shared axes for an entire length of a given component. For example, an axis defined by vacuum tube 120 may deviate from drive-gear rotational axis 115 at other points along the length of vacuum tube 120, for example to provide for convenient coupling to an external vacuum and material collection system.

Referring generally to FIG. 1 and particularly to, e.g., FIGS. 2-4, 7, and 8, at least a portion of solvent supply 130 is parallel to drive-gear rotational axis 115. The preceding subject matter of this paragraph characterizes example 3 of the present disclosure, wherein example 3 also includes the subject matter according to example 1 or 2, above.

Locating at least a portion of solvent supply 130 parallel to drive-gear rotational axis 115 provides compact, efficient delivery of solvent.

It may be noted that solvent supply 130, in one or more examples, includes one or more tubes or hoses that have one or more portions that deviate from parallel with drive-gear rotational axis 115 (e.g., for routing around components of cleaning device 100 and/or for convenient coupling with source of solvent to be supplied via solvent supply 130).

Referring generally to FIG. 1 and particularly to, e.g., FIGS. 2-4, solvent supply 130 comprises first solvent tube 131 and second solvent tube 132. First solvent tube 131 is proximate first end 133 of housing 112, and second solvent tube 132 is proximate second end 134 of housing 112. First end 133 and second end 134 are opposite each other. The preceding subject matter of this paragraph characterizes example 4 of the present disclosure, wherein example 4 also includes the subject matter according to example 3, above.

Use of plural solvent tubes located on opposite sides of housing 112 provides efficient placement of solvent along a path of travel and at edges of brushes for dispersal and collection toward a central location.

Referring generally to FIG. 1 and particularly to, e.g., FIGS. 9 and 10, driven gears 116 comprise directly driven gear 216 that is directly in mesh with drive gear 114. The preceding subject matter of this paragraph characterizes example 5 of the present disclosure, wherein example 5 also includes the subject matter according to any one of examples 1 to 4, above.

Use of at least one directly driven gear in mesh with drive gear 114 provides space-efficient direct drive of driven gear(s), reducing the number of parts required and providing a compact design. It may be noted that, in one or more examples, more than one of driven gears 116 are directly driven. For example, in various embodiments, half of the total number of driven gears 116 are directly driven, while half are indirectly driven. It may further be noted that directly driven gear 216 (or a plurality of such gears) rotates in an opposite direction from drive gear 114 (e.g., if drive gear 114 rotates clockwise, directly driven gear 216 rotates counter-clockwise).

Referring generally to FIG. 1 and particularly to, e.g., FIGS. 9 and 10, driven gears 116 comprise indirectly driven gear 316 that is not directly in mesh with drive gear 114. The preceding subject matter of this paragraph characterizes example 6 of the present disclosure, wherein example 6 also includes the subject matter according to any one of examples 1 to 5, above.

Use of at least one indirectly driven gear allows for changing of direction of rotation relative to directly driven gear(s). Indirectly driven gears are rotated in the same direction as drive gear 114. For instance, if drive gear 114 rotates clockwise, indirectly driven gear 316 (or a plurality of such gears) rotates clockwise. It may be noted that, in one or more examples, more than one of driven gears 116 are indirectly driven. For example, in various examples, half of the total number of driven gears 116 are indirectly driven, while the other half are directly driven.

Referring generally to FIG. 1 and particularly to, e.g., FIGS. 9 and 10, cleaning device 100 further comprises idler gear 317 in mesh with, and interposed between, drive gear 114 and indirectly driven gear 316. The preceding subject matter of this paragraph characterizes example 7 of the present disclosure, wherein example 7 also includes the subject matter according to example 6, above.

Idler gear 317 provides a space-efficient design for providing for changing of direction of rotation of driven gears with respect to each other, for example allowing at least one driven gear to rotate in same direction as drive gear 114. It may be noted that idler gear 317 rotates in a direction, opposite to the direction of rotation of drive gear 114, and indirectly driven gear 316 (which is driven directly by idler gear 317) rotates in a direction opposite to the direction of rotation of idler gear 317. Accordingly, indirectly driven gear 316 rotates in the same direction as drive gear 114, when idler gear 317 is interposed between and in mesh with drive gear 114 and indirectly driven gear 316.

Referring generally to FIG. 1 and particularly to, e.g., FIGS. 9-12, driven gears 116 comprise directly driven gear 216 and indirectly driven gear 316. Directly driven gear 216 rotates in first direction 218, opposite to second direction 318, in which indirectly driven gear 316 rotates. The preceding subject matter of this paragraph characterizes example 8 of the present disclosure, wherein example 8 also includes the subject matter according to any one of examples 1 to 4, above.

Rotating directly driven gear 216 and indirectly driven gear 316 in opposite directions allows gears on opposite sides (e.g., on opposite sides of solvent tube) to drive contaminant in same lateral direction.

Accordingly, for example, as seen in FIG. 10, rotating one gear in a clockwise direction and a neighboring gear in a counter-clockwise direction, allows proximate portions of each gear (and accordingly, brushes rotating with the gears) to pass in the same linear direction, for example to drive material toward an interior of cleaning device 100.

Referring generally to FIG. 1 and particularly to, e.g., FIGS. 9-12, directly driven gear 216 that rotates in first direction 218 and indirectly driven gear 316 that rotates in second direction 318 are located on opposite sides of solvent supply 130. Directly driven gear 216 is coupled to and rotates one of brushes 140 in first direction 218 and indirectly driven gear 316 is coupled to and rotates another one of brushes 140 in second direction 318. The preceding subject matter of this paragraph characterizes example 9 of the present disclosure, wherein example 9 also includes the subject matter according to example 8, above.

Rotation of brushes 140 in opposite directions allows rapid driving of contaminant reacting with solvent toward the vacuum tube.

For example, during a cleaning process, solvent 106 is discharged, via solvent supply 130, onto a location of surface 104 to be cleaned. Then, brushes 140 agitate material (including contaminant and/or debris on surface 104) lifted by solvent 106. Next, the material (e.g., contaminant and/or debris) along with solvent and solvent vapors are evacuated.

Referring generally to FIG. 1 and particularly to, e.g., FIGS. 2, 7, and 8, cleaning device 100 also comprises shroud 110, coupled to housing 112 and surrounding brushes 140. The preceding subject matter of this paragraph characterizes example 10 of the present disclosure, wherein example 10 also includes the subject matter according to any one of examples 1 to 9, above.

Shroud 110 helps maintain contaminant and solvent within reach of brushes 140 for easier removal. Shroud 110 also helps contain solvent vapors for collection via vacuum.

Shroud 110, in one or more examples, is cast or molded from plastic. Shroud 110 in various examples is configured to allow for convenient handling by an operator. Further, shroud 110 in various examples includes features for coupling to other components, as discussed herein.

Referring generally to FIG. 1 and particularly to, e.g., FIGS. 2, 7, and 8, shroud 110 is sufficiently compressible to conform to protuberances on surface 104 being cleaned when cleaning device 100 is urged against surface 104. The preceding subject matter of this paragraph characterizes example 11 of the present disclosure, wherein example 11 also includes the subject matter according to example 10, above.

Compressibility of shroud 110 allows for cleaning device 100 to be urged against the surface to be cleaned with positive force while protecting the surface to be cleaned from damage from shroud 110. It may be noted that, in one or more examples, the compressibility of shroud 110 is achieved mechanically (e.g., via the shape of one or more portions of shroud 110) and/or by material used (e.g., via use of a sufficiently compressible material).

Referring generally to FIG. 1 and particularly to, e.g., FIGS. 7 and 8, shroud 110 comprises bellows 111. The preceding subject matter of this paragraph characterizes example 12 of the present disclosure, wherein example 12 also includes the subject matter according to example 10 or 11, above.

Bellows 111 provides improved ability to conform to uneven surface. In one or more examples, the number and size of folds for bellows 111 are based on material used and desired compressibility.

Referring generally to FIG. 1 and particularly to, e.g., FIGS. 2, 7, and 8, shroud 110 defines cavity 210 in which brushes 140 are located. Shroud 110 comprises at least one vacuum port 160, which is in fluidic communication with cavity 210. The preceding subject matter of this paragraph characterizes example 13 of the present disclosure, wherein example 13 also includes the subject matter according to any one of examples 10 to 12, above.

Use of at least one vacuum port 160 allows additional capacity for contaminant removal, and provides for removal from additional locations around the brushes. Cavity 210 provides for containment of any contaminant that may be removed from brushes 140 during rotation of brushes 140, and also allows shroud 110 to protect brushes 140 from environment.

In one or more examples, at least one vacuum port 160 is formed integrally with shroud 110, for example by including openings for at least one vacuum port 160 during molding of shroud 110.

Referring generally to FIG. 1 and particularly to, e.g., FIGS. 2, 7, 8, and 15, shroud 110 comprises contact end 161 and slot 163, located proximate contact end 161. The preceding subject matter of this paragraph characterizes example 14 of the present disclosure, wherein example 14 also includes the subject matter according to any one of examples 10 to 13, above.

Use of slot 163 accommodates surface irregularities on surface 104. The particular configuration of slot 163 (including size of slot 163, location of slot 163, and whether there are plural slots 163) may be configured for a given application.

Referring generally to FIG. 1 and particularly to, e.g., FIGS. 2-4, cleaning device 100 additionally comprises gearbox 150, coupled to and configured to actuate drive gear 114. The preceding subject matter of this paragraph characterizes example 15 of the present disclosure, wherein example 15 also includes the subject matter according to any one of examples 10 to 14, above.

Gearbox 150 allows for compact driving of drive gear 114. In one or more examples, gearbox 150 is driven by an external source or a source, mounted to gearbox 150 (e.g., battery-driven motor). In one or more examples, gearbox 150 is sized and/or shaped for convenient grasping or manipulation for handheld operation of cleaning device 100.

Referring generally to FIG. 1 and particularly to, e.g., FIGS. 2 and 15, shroud 110 comprises gearbox-interlock features 165, configured to be coupled with gearbox 150 such that gearbox 150 and shroud 110 have a predetermined orientation relative to each other. The preceding subject matter of this paragraph characterizes example 16 of the present disclosure, wherein example 16 also includes the subject matter according to example 15, above.

Use of gearbox-interlock features 165 helps align gearbox 150 with shroud 110 and/or other aspects of cleaning device 100, and ensures that gearbox 150 and rest of cleaning device 100 move together. It may be noted that, in various examples, different numbers, sizes, or shapes of gearbox-interlock features 165 may be utilized. In one or more examples, gearbox-interlock features 165 cooperate with dedicated cooperating features of gearbox 150 and/or with outer contours of gearbox 150.

Referring generally to FIG. 1 and particularly to, e.g., FIGS. 3-6 and 11, housing 112 comprises magnets 113 on gearbox-facing surface 119 of housing 112 to magnetically couple housing 112 with gearbox 150. The preceding subject matter of this paragraph characterizes example 17 of the present disclosure, wherein example 17 also includes the subject matter according to example 16, above.

Magnets 113 provide convenient mounting/removal of housing 112 to gearbox 150. In one or more examples, magnets 113 magnetically couple to corresponding magnets on gearbox 150. Alternatively, in one or more examples, gearbox 150 is made of a metal or includes metallic portions, configured to cooperate with magnets 113.

Referring generally to FIG. 1 and particularly to, e.g., FIGS. 11, 15, and 16, housing 112 comprises locating recesses 151 on gearbox-facing surface 119 of housing 112, and shroud 110 comprises locating protrusions 152, geometrically complementary with locating recesses 151. The preceding subject matter of this paragraph characterizes example 18 of the present disclosure, wherein example 18 also includes the subject matter according to example 16 or 17, above.

Locating recesses 151 and locating protrusions 152 cooperate to ensure proper alignment between housing 112 and shroud 110 for locating features (e.g., solvent tubes) that pass through each.

Referring generally to FIG. 1 and particularly to, e.g., FIG. 14, housing 112 comprises brush sockets 141, and brushes 140 comprise brush stems 142. Each of brush stems 142 corresponds to one of brushes 140, and brush stems 142 are configured to be received by brush sockets 141 to attach brushes 140 to housing 112. The preceding subject matter of this paragraph characterizes example 19 of the present disclosure, wherein example 19 also includes the subject matter according to any one of examples 1 to 18, above.

Brush stems 142 and brush sockets 141 provide for easy attachment/detachment of brushes 140 for cleaning, maintenance, and/or replacement.

Referring generally to FIG. 1 and particularly to, e.g., FIG. 14, brush stems 142 are received by brush sockets 141 with a frictional fit. The preceding subject matter of this paragraph characterizes example 20 of the present disclosure, wherein example 20 also includes the subject matter according example 19, above.

Use of a frictional fit between brush stems 142 and brush sockets 141 provides for convenient placement of brushes 140 without requiring additional tools or fasteners. A frictional fit, as used herein, may be understood as a fit that provides sufficient friction between brush stems 142 and brush sockets 141 to enable brush stems 142 to stay in place when exposed to forces experienced during normal operation of cleaning device 100.

Referring generally to FIG. 1 and particularly to, e.g., FIG. 14, brush stems 142 and brush sockets 141 have complementary cross-sectional shapes that are non-circular. The preceding subject matter of this paragraph characterizes example 21 of the present disclosure, wherein example 21 also includes the subject matter according to example 19 or 20, above.

Use of non-circular shapes ensures that brushes 140 rotate with brush sockets 141 as desired. Further, use of such shapes eliminates the need for additional keys or other projections from brush stems 142 to prevent rotation with respect to brush sockets 141.

Referring generally to FIG. 1 and particularly to, e.g., FIG. 14, the complementary cross-sectional shapes of brush stems 142 and brush sockets 141 are rectangular. The preceding subject matter of this paragraph characterizes example 22 of the present disclosure, wherein example 22 also includes the subject matter according to example 21, above Rectangular (e.g., square shapes) provide easy to manufacture and use shapes for installing and removing brushes 140.

Referring generally to FIGS. 13A and 13B and particularly to, e.g., FIGS. 1-12, method 500 of cleaning surface 104 is disclosed. Method 500 comprises (block 502) urging brushes (140) of cleaning device 100 against surface 104. Method 500 also comprises (block 504) providing solvent 106 to surface 104 via solvent supply 130 that passes through housing 112 of cleaning device 100. Method 500 further comprises (block 506) rotating drive gear 114 about drive-gear rotational axis 115 to drive driven gears 116 about corresponding driven-gear rotational axes 117 inside housing 112 to rotate brushes 140. Method 500 additionally comprises (block 510) evacuating material 108 from surface 104 via vacuum tube 120, passing through housing 112. The preceding subject matter of this paragraph characterizes example 23 of the present disclosure.

Method 500 provides the use of multiple brushes for pulling contaminant toward a central location for more efficient removal of contaminant and avoidance of dispersing contaminant laterally along surface being cleaned.

Generally, solvent 106 is applied to surface 104 (e.g., via one or more tubes or hoses of solvent supply 130). Surface 104, for example, may be a surface of a workpiece that has contaminant or undesirable material disposed thereon following and/or proceeding a process to be performed on the workpiece. Brushes 140 apply solvent 106 to contaminant on surface 104 and distribute solvent 106 along surface 104, and also help direct material 108 to vacuum tube 120 for removal from surface 104. Material removed from surface 104, as used herein, includes one or more of contaminants (e.g., oils), solvent, solvent vapors, or debris.

Referring generally to FIGS. 13A and 13B and particularly to, e.g., FIGS. 11-12, method 500 further comprises (block 508) translating cleaning device 100 along cleaning path 103 across surface 104. The preceding subject matter of this paragraph characterizes example 24 of the present disclosure, wherein example 24 also includes the subject matter according to example 23, above.

Translating cleaning device 100 along a desired path allows an entire surface to be cleaned efficiently. The path may be selected to efficiently cover an area to be cleaned. The path may, for example, be selected by an operator utilizing cleaning device 100. The path in various embodiments has one or more sections that are linear, circular, curved, and/or reciprocal.

Referring generally to FIGS. 13A and 13B and particularly to, e.g., FIGS. 3, 4, 7, and 8, according to method 500, (block 510) evacuating material 108 from surface 104 via vacuum tube 120 comprises evacuating material 108 in a direction along drive-gear rotational axis 115. The preceding subject matter of this paragraph characterizes example 25 of the present disclosure, wherein example 25 also includes the subject matter according to example 23 or 24, above.

Evacuating material 108 along drive-gear rotational axis 115 provide for efficient central removal of contaminant driven by brushes 140 toward center of apparatus.

Referring generally to FIGS. 13A and 13B and particularly to, e.g., FIGS. 3, 4, 7, and 8, according to method 500, (block 504) providing solvent 106 to surface 104 comprises (block 514) providing solvent 106 along a path, at least a portion of which is parallel to drive-gear rotational axis 115. The preceding subject matter of this paragraph characterizes example 26 of the present disclosure, wherein example 26 also includes the subject matter according to any one of examples 23 to 25, above.

Providing solvent 106 along a path, parallel to drive-gear rotational axis 115, provides compact, efficient delivery of solvent.

Referring generally to FIGS. 13A and 13B and particularly to, e.g., FIGS. 3, 4, 7, and 8, according to method 500, (block 504) providing solvent 106 to surface 104 comprises 516 providing solvent 106 to surface 104 via first solvent tube 131 and second solvent tube 132. Furthermore, first solvent tube 131 is located proximate first end 133 of housing 112, second solvent tube 132 is located proximate second end 134 of housing 112, and first end 133 and second end 134 of housing 112 are opposite each other. The preceding subject matter of this paragraph characterizes example 27 of the present disclosure, wherein example 27 also includes the subject matter according to example 26, above.

Location solvent tubes on opposite ends of housing 112 provides efficient placement of solvent along path of travel and at edges of brushes for dispersal and collection toward center of brushes.

Referring generally to FIGS. 13A and 13B and particularly to, e.g., FIGS. 9-12, according to method 500, driven gears 116 comprise directly driven gear 216. Furthermore, (block 506) rotating drive gear 114 about drive-gear rotational axis 115 to drive driven gears 116 comprises (block 518) driving directly driven gear 216 directly by drive gear 114. The preceding subject matter of this paragraph characterizes example 28 of the present disclosure, wherein example 28 also includes the subject matter according to any one of examples 23 to 27, above.

Directly driving at least one drive gear provides efficient direct drive, reduces the number of parts required, and utilizes a compact, space-efficient design.

Referring generally to FIGS. 13A and 13B and particularly to, e.g., FIGS. 9-12, according to method 500, driven gears 116 comprise indirectly driven gear 316. Furthermore, (block 506) rotating drive gear 114 about drive-gear rotational axis 115 to drive driven gears 116 comprises (block 520) driving indirectly driven gear 316 by drive gear 114 via idler gear 317, in mesh with drive gear 114 and indirectly driven gear 316. The preceding subject matter of this paragraph characterizes example 29 of the present disclosure, wherein example 29 also includes the subject matter according to any one of examples 23 to 28, above.

Indirectly driving of gears allows for changing of direction of rotation relative to directly driven gear.

Referring generally to FIGS. 13A and 13B and particularly to, e.g., FIGS. 9-12, according to method 500, driven gears 116 comprise directly driven gear 216 and indirectly driven gear 316. Furthermore, (block 506) rotating drive gear 114 about drive-gear rotational axis 115 to drive driven gears 116 comprises (block 522) rotating directly driven gear 216 in first direction 218, and rotating indirectly driven gear 316 in second direction 318 that is opposite to first direction 218. The preceding subject matter of this paragraph characterizes example 30 of the present disclosure, wherein example 30 also includes the subject matter according to any one of examples 23 to 27, above.

Rotating gears in opposite directions allows gears on opposite sides (e.g., on opposite sides of solvent tube) to drive contaminant in same lateral direction.

Referring generally to FIGS. 13A and 13B and particularly to, e.g., FIGS. 2, 7, and 8, according to method 500, (block 510) evacuating material 108 from surface 104 comprises (block 524) evacuating some of material 108 via at least one vacuum port 160, formed in shroud 110, surrounding brushes 140, and in fluid communication with cavity 210 of shroud 110. The preceding subject matter of this paragraph characterizes example 31 of the present disclosure, wherein example 31 also includes the subject matter according to any one of examples 23 to 30, above.

Use of at least one vacuum port 160 allows additional capacity for contaminant removal, and also provides for removal from additional locations around the brushes in addition to a central location.

Referring generally to FIGS. 13A and 13B and particularly to, e.g., FIGS. 2, 4, and 8, according to method 500, (block 506) rotating drive gear 114 about drive-gear rotational axis 115 comprises (block 526) actuating drive gear 114 with gearbox 150. The preceding subject matter of this paragraph characterizes example 32 of the present disclosure, wherein example 32 also includes the subject matter according to example 31, above.

Gearbox 150 provides a compact design for driving of drive gear. In one or more examples, gearbox 150 is mounted to housing 112 and/or shroud 110 providing a single, easy-to-handle unit.

Referring generally to FIGS. 13A and 13B and particularly to, e.g., FIGS. 1, 3-6, and 11, method 500 further comprises (block 534) removably coupling housing 112 to gearbox 150. The preceding subject matter of this paragraph characterizes example 33 of the present disclosure, wherein example 33 also includes the subject matter according to example 32, above.

Removably coupling housing 112 and gearbox 150 allows for easier maintenance or replacement of gearbox 150 or housing 112.

Referring generally to FIGS. 13A and 13B and particularly to, e.g., FIGS. 1, 3-6, and 11, according to method 500, (block 534) removably coupling housing 112 to gearbox 150 comprises (block 536) magnetically coupling housing 112 to gearbox 150. The preceding subject matter of this paragraph characterizes example 34 of the present disclosure, wherein example 34 also includes the subject matter according to example 33, above.

Use of magnets to couple housing 112 to gearbox 150 allows for convenient, tool-free coupling and de-coupling of housing 112 and gearbox 150.

Referring generally to FIGS. 13A and 13B and particularly to, e.g., FIGS. 1, 11, 15, and 16, method 500 further comprises (block 538) removably coupling shroud 110 to housing 112. The preceding subject matter of this paragraph characterizes example 35 of the present disclosure, wherein example 35 also includes the subject matter according to any one of examples 32 to 34, above.

Removably coupling shroud 110 and housing 112 allows for easier maintenance and/or replacement of housing 112 and shroud 110.

Referring generally to FIGS. 13A and 13B and particularly to, e.g., FIGS. 1, 11, 13, 15, and 16, according to method 500, (block 538) removably coupling shroud 110 to gearbox 150 comprises (block 540) mating locating protrusions 152 of shroud 110 with locating recesses 151 of housing 112. The preceding subject matter of this paragraph characterizes example 36 of the present disclosure, wherein example 36 also includes the subject matter according to example 35, above.

Use of locating recesses 151 and locating protrusions 152 allows for convenient placement and positive feedback for desired alignment between housing 112 and shroud 110.

Referring generally to FIGS. 13A and 13B and particularly to, e.g., FIGS. 1, 2, and 15, method 500 further comprises (block 542) removably coupling gearbox 150 to shroud 110. The preceding subject matter of this paragraph characterizes example 37 of the present disclosure, wherein example 37 also includes the subject matter according to example 36, above.

Removably coupling gearbox 150 to shroud 110 allows for easier maintenance and/or replacement of gearbox 150 and shroud 110.

Referring generally to FIGS. 13A and 13B and particularly to, e.g., FIGS. 1, 2, and 15, according to method 500, (block 542) removably coupling gearbox 150 to shroud 110 comprises using gearbox-interlock features 165 of shroud 110 to couple gearbox 150 with shroud 110 such that gearbox 150 and shroud 110 have a predetermined orientation relative to each other. The preceding subject matter of this paragraph characterizes example 38 of the present disclosure, wherein example 38 also includes the subject matter according to example 37, above.

Use of gearbox-interlock features 165 allows for conveniently achieving and maintaining desired alignment between shroud 110 and gearbox 150.

Referring generally to FIGS. 13A and 13B and particularly to, e.g., FIGS. 1 and 14, method 500 further comprises (block 530) removably coupling brushes 140 to housing 112. The preceding subject matter of this paragraph characterizes example 39 of the present disclosure, wherein example 39 also includes the subject matter according to any one of examples 23 to 38, above.

Removable coupling of brushes 140 to housing 112 allows maintenance/replacement of brushes.

Referring generally to FIGS. 13A and 13B and particularly to, e.g., FIGS. 1 and 14, according to method 500, (block 530) removably coupling brushes 140 to housing 112 comprises (block 532) inserting brush stems 142 of brushes 140 into brush sockets 141 of housing 112. The preceding subject matter of this paragraph characterizes example 40 of the present disclosure, wherein example 40 also includes the subject matter according to example 39, above.

Insertion of brush stems 142 into brush sockets 141 allows for convenient, tool-free coupling/de-coupling of brushes 140 to housing 112.

Referring generally to FIGS. 13A and 13B and particularly to, e.g., FIGS. 1 and 14, according to method 500, inserting brush stems 142 of brushes 140 into brush sockets 141 of housing 112 comprises inserting brush stems 142 into brush sockets 141 with a frictional fit. The preceding subject matter of this paragraph characterizes example 41 of the present disclosure, wherein example 41 also includes the subject matter according to example 40, above.

Use of a frictional fit between brush stems 142 and brush sockets 141 provides for convenient placement of brushes 140 without requiring additional tools or fasteners. A frictional fit, as used herein, may be understood as a fit that provides sufficient friction between brush stems 142 and brush sockets 141 to enable brush stems 142 to stay in place when exposed to forces experienced during normal operation of cleaning device 100.

Examples of the present disclosure may be described in the context of aircraft manufacturing and service method 1100 as shown in FIG. 17 and aircraft 1102 as shown in FIG. 18. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of cleaning a surface, the method comprising steps of:
   urging brushes of a cleaning device against the surface;
   providing solvent to the surface via a solvent supply that passes through a housing of the cleaning device;
   rotating a drive gear about a drive-gear rotational axis to drive driven gears about corresponding driven-gear rotational axes inside the housing to rotate the brushes; and
   evacuating material from the surface via a vacuum tube, passing through the housing.

2. The method according to claim 1, further comprising translating the cleaning device along a cleaning path across the surface.

3. The method according to claim 1, wherein the step of evacuating the material from the surface via the vacuum tube comprises evacuating the material in a direction along the drive-gear rotational axis.

4. The method according to claim 1, wherein the step of providing solvent to the surface comprises providing the solvent along a path, at least a portion of which is parallel to the drive-gear rotational axis.

5. The method according to claim 4, wherein:
   the step of the providing solvent to the surface comprises providing the solvent to the surface via a first solvent tube and a second solvent tube;
   the first solvent tube is located proximate a first end of the housing;
   the second solvent tube is located proximate a second end of the housing; and
   the first end and second end of the housing are opposite each other.

6. The method according to claim 1, wherein:
   the driven gears comprise a directly driven gear; and
   the step of rotating the drive gear about the drive-gear rotational axis to drive the driven gears comprises driving the directly driven gear directly by the drive gear.

7. The method according to claim 1, wherein:
   the driven gears comprise an indirectly driven gear; and
   the step of rotating the drive gear about the drive-gear rotational axis to drive the driven gears comprises driving the indirectly driven gear by the drive gear via an idler gear, in mesh with the drive gear and the indirectly driven gear.

8. The method according to claim 1, wherein:
   the driven gears comprise a directly driven gear and an indirectly driven gear; and
   the step of rotating the drive gear about the drive-gear rotational axis to drive the driven gears comprises rotating the directly driven gear in a first direction, and rotating the indirectly driven gear in a second direction that is opposite to the first direction.

9. The method according to claim 1, wherein the step of evacuating the material from the surface comprises evacuating some of the material via at least one vacuum port, formed in a shroud, surrounding the brushes, and in fluid communication with a cavity of the shroud.

10. The method according to claim 9, wherein the step of rotating the drive gear about the drive-gear rotational axis comprises actuating the drive gear with a gearbox.

11. The method according to claim 10, further comprising removably coupling the housing to the gearbox.

12. The method according to claim 11, wherein the step of removably coupling the housing to the gearbox comprises magnetically coupling the housing to the gearbox.

13. The method according to claim 10, further comprising removably coupling the shroud to the housing.

14. The method according to claim 13, wherein the step of removably coupling the shroud to the housing comprises mating locating protrusions of the shroud with locating recesses of the housing.

15. The method according to claim 14, further comprising a step of removably coupling the gearbox to the shroud.

16. The method according to claim 15, wherein the step of removably coupling the gearbox to the shroud comprises using gearbox-interlock features of the shroud to couple the gearbox with the shroud such that the gearbox and the shroud have a predetermined orientation relative to each other.

17. The method according to claim 1, further comprising removably coupling the brushes to the housing.

18. The method according to claim 17, wherein the step of removably coupling the brushes to the housing comprises a step of inserting brush stems of the brushes into brush sockets of the housing.

19. The method according to claim 18, wherein the step of inserting the brush stems of the brushes into the brush sockets of the housing comprises inserting the brush stems into the brush sockets with a frictional fit.

20. A method of cleaning a surface, the method comprising steps of:
   urging brushes of a cleaning device against the surface;
   translating the cleaning device along a cleaning path across the surface;
   providing solvent to the surface via a solvent supply that passes through a housing of the cleaning device, wherein the step of providing the solvent to the surface comprises providing the solvent along a path, at least a portion of which is parallel to a drive-gear rotational axis;
   rotating a drive gear about the drive-gear rotational axis to drive driven gears about corresponding driven-gear rotational axes inside the housing to rotate the brushes; and
   evacuating material from the surface via a vacuum tube, passing through the housing, wherein the step of evacuating the material from the surface via the vacuum tube comprises evacuating the material in a direction along the drive-gear rotational axis.

21. The method according to claim 1, wherein the vacuum tube passes through the drive gear at a location where the vacuum tube is co-axial with the drive-gear rotational axis.

22. The method according to claim 20, wherein the vacuum tube passes through the drive gear at a location where the vacuum tube is co-axial with the drive-gear rotational axis.

* * * * *